March 12, 1968 S. C. SCHUMAN 3,373,218
PRODUCTION OF ETHYLENE AND ACETYLENE
Filed June 7, 1965 2 Sheets-Sheet 1

INVENTOR
SEYMOUR C. SCHUMAN

United States Patent Office 3,373,218
Patented Mar. 12, 1968

3,373,218
PRODUCTION OF ETHYLENE AND ACETYLENE
Seymour C. Schuman, P.O. Box 252,
Rocky Hill, N.J. 08553
Filed June 7, 1965, Ser. No. 462,000
17 Claims. (Cl. 260—679)

ABSTRACT OF THE DISCLOSURE

A process for the production of ethylene and acetylene as major co-products by reaction of a light hydrocarbon with elemental sulfur in proportions corresponding to from about 0.25 to 2.5 moles of $S_2$ per moles of $C_2$ and heavier hydrocarbons in the total feed, and at a temperature from 1450° F. to 1650° F., and at other specified conditions of pressure and contact time.

---

Figure 1:
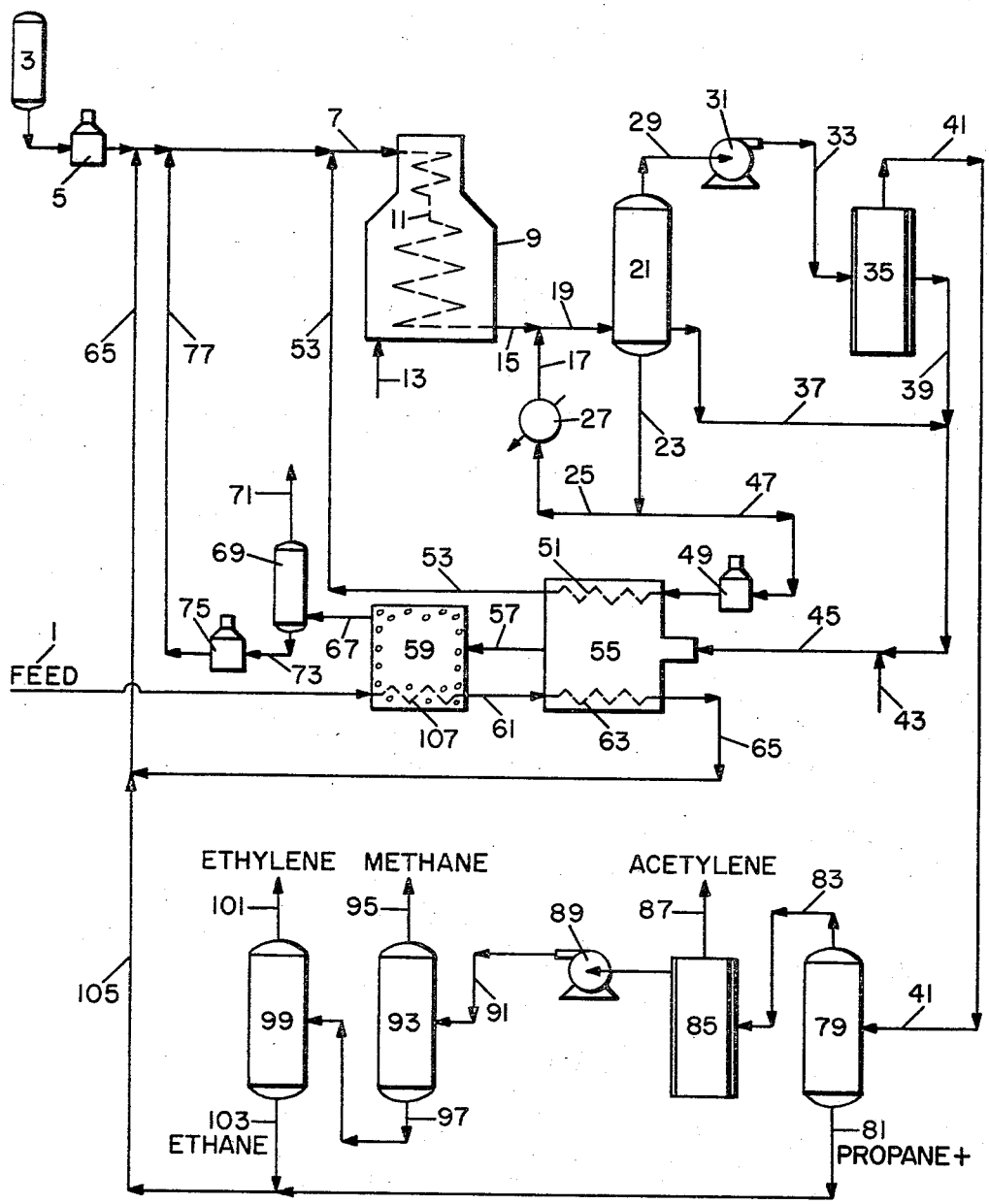

This invention relates to a novel method for the simultaneous production of ethylene and acetylene.

Ethylene and acetylene are important petrochemical intermediates, and are the "building-blocks" for a number of derivative compounds and products including ethanol, vinyl chloride, ethylene dichloride, ethyl chloride, acetaldehyde, acetic acid, polyethylene, acrylic fibers, and the like. Thus, the simultaneous production of ethylene and acetylene is an important objective since it would enable the production at one site of a wide variety of useful products. In addition, the availability of ethylene together with acetylene at a single location has important economic advantages in the production of vinyl chloride. In this case, the ethylene would be chlorinated to produce ethylene dichloride which would then be decomposed to vinyl chloride and hydrogen chloride; the hydrogen chloride would then be combined with acetylene to produce additional quantities of vinyl chloride. In this way, chlorine is used most effectively, for in the absence of acetylene, vinyl chloride produced from ethylene would liberate large quantities of hydrogen chloride virtually impossible to utilize or dispose.

A primary object of this invention therefore, is to produce ethylene together with acetylene as major products by a process which is more economical than those presently utilized. Practically, this condition would not be satisfied if very large yields of ethylene were obtained along with very small yields of acetylene or vice versa, since the product obtained in small yields would be virtually useless because most of the derivative chemicals which might be produced from it are required in very large volumes. In such a case, also, very inefficient utilization of chlorine and/or hydrogen chloride would be obtained in a vinyl chloride plant based on the ethylene-acetylene products. In this respect, I consider that an economic process should yield from about 0.5 to about 2.0 parts by weight of ethylene for each part of acetylene produced. Thus, if yields were relatively high in ethylene and low in acetylene but within these limits, part of the ethylene product might be converted to polyethylene, ethanol, and the like, to the extent that the remainder could be balanced with the acetylene product to produce vinyl chloride. Alternatively, if my process were operated to produce substantially more acetylene than ethylene again within the limits specified, part of the acetylene product might be converted to acrylonitrile, to the extent that the remainder could be balanced wih the ethylene product to produce vinyl chloride.

Ethylene is conventionally produced by pyrolysis of a wide range of hydrocarbon feeds from gaseous hydrocarbons such as ethane to liquid hydrocarbons such as naphtha, or furnace oil. Where natural gas is available (such as in the U.S.A.), light hydrocarbons such as ethane and/or propane extracted from the natural gas conveniently serve as feed sources; where natural gas is unavailable (such as in Europe) light naphtha fractions obtained from crude oils are used as feeds. Ethylene yields from 40 to 80 weight percent are readily obtained; however, large amounts of tar, methane, and hydrogen and very small amounts of acetylene are also produced. These co-products, in addition to their subtractive effects on ethylene yields, largely increase the net cost of producing ethylene because of the necessity of their removal and disposal.

Also, the capital cost of such an ethylene plant is very large by reason of the size and complex design of the pyrolysis furnaces, and the high cost of the low temperature system required to recover and purify the ethylene. The pyrolysis reactions are highly endothermic requiring a heat input so substantial that reactors are designed with greater attention to the attainment of said heat input than to optimization of other operating conditions. Ethylene recovery and purification is made costly by (a) the relatively low conversion per pass obtained requiring separation of unconverted ethane from the ethylene product and recycle of the former, (b) the need to liquefy ethylene and ethane in the presence of considerable quantities of methane and hydrogen, and (c) the need to selectively hydrogenate the acetylene contaminant without hydrogenating any of the ethylene produced.

It should also be noted that it is impossible to produce major amounts of acetylene together with ethylene from such a pyrolysis system. The temperatures and contact times required to produce major amounts of acetylene are impossible to attain and coke formation would be an insuperable problem.

Various attempts to produce ethylene by cyclical processes are also described in the literature [Linden and Reid, Chemical Engineering Progress 55, 71–78 (1959); Eastwood and Potas, Petroleum Refiner 27, 468–70 (1948); Fleming, Chemical Engineering Progress 52, 249–54 (1956)]. These involve pyrolysis over an inert solid, followed by combustion of the carbon formed on the solid with air to provide at least part of the heat required for the pyrolysis. The solids are continuously removed from the pyrolysis zone using conventional moving or fluid bed techniques, or are cyclically regenerated in a fixed bed. Although such systems make the design of an ethylene unit much less subject to the criticality and high cost of the pyrolysis section, they substitute many other difficulties and are not used commercially to any extent at this time.

Acetylene is prevalently produced by the partial oxidation of natural gas. Yields are only about 25% based on feed, with most of the yield loss attributable to the concomitant formation of hydrogen, carbon monoxide, and carbon dioxide together with smaller quantities of ethylene, higher acetylenes, tar and coke. Here again, because of the many low boiling co-products, the cost of acetylene recovery and purification systems is very high. Although the partial oxidation reaction is exothermic and avoids the difficulties of endothermic pyrolytic processes, the cost of the relatively pure oxygen which is employed is high and construction of the reactors which operate at temperatures in the range of 2500° F. and 3000° F. is not simple.

In any event, neither of the two described ethylene processes nor the foregoing process for producing acetylene produces useful quantities of the other product.

Two processes which are said to produce ethylene and acetylene at the same time and in a single process are described in Hydrocarbon Processing and Petroleum Refiner 42, 11, 134–35, (1963). These processes are essentially a combination of partial oxidation and pyrolysis. In each of these, liquid or gaseous hydrocarbon fuels together with controlled quantities of oxygen and steam are fed to a burner, and the feedstock injected into the hot combustion effluent where it pyrolyzes at a relatively high temperature and low contact time, and is then rapidly quenched. These processes are said to produce total acetylene and ethylene yields of about 50%, but they suffer from all of the difficulties experienced in the production of acetylene by partial oxidation, together with even greater difficulties in ethylene separation and recovery than experienced in conventional ethylene plants. For example, tar and carbon removal problems are much more severe than in conventional processing to produce acetylene along, while the ethylene recovery and separation section must not only cope with co-produced ethane, methane and hydrogen as in a simple pyrolysis unit, but also with large quantities of carbon dioxide and, even more importantly, of carbon monoxide. Thus, although commercial plants have been built using these processes, such use is not extensive.

In accordance with my invention, ethylene and acetylene are simultaneously produced as major products, and in commercially important relative proportions from about 0.5 to about 2.0 parts of ethylene to each part of acetylene, and in such manner as to minimize the difficulties of the prior art methods described. In essence, in my process, a suitable hydrocarbon feed is reacted with elemental sulfur at elevated temperatures to produce the ethylene and acetylene together with hydrogen sulfide. This reaction, herein designated as sulfoxidation is mildly endothermic and may be typically represented by the chemical equation $$C_2H_6 + \tfrac{3}{2} S_2 \rightarrow C_2H_4 + C_2H_2 + 3H_2S$$

(For simplicity, here and elsewhere, I have used the formula $S_2$ for elemental sulfur, although it is well known that elemental sulfur may exist as $S_2$, $S_6$, $S_8$ and the like). However, I have also found that it is economically important to reconvert the hydrogen sulfide co-product to elemental sulfur by the well known reaction conventionally designated as the Claus reaction, i.e.

$$3H_2S + \tfrac{3}{2} O_2 \rightarrow 3H_2O + \tfrac{3}{2} S_2$$

herein designated as the reconversion step. When the sulfoxidation step and the reconversion step are practiced concomitantly, the overall process is in effect an oxidation, i.e.

$$C_2H_6 + \tfrac{3}{2} O_2 \rightarrow C_2H_4 + C_2H_2 + 3H_2O$$

and theoretically requires no net utilization of elemental sulfur. Furthermore, the overall process becomes exothermic. i.e. the heat released by the exothermic recoversion step exceeds the endothermic requirements of the sulfoxidation step.

Although prior workers in the art have proposed producing acetylene or ethylene from a hydrocarbon source using elemental sulfur, none has described the concomitant production of the two in useful proportions. Thus, R. G. Wulff, U.S. Patent No. 1,880,310, suggests that principally chlorine, but also bromine or sulfur vapor may be utilized to produce acetylene from various hydrocarbons at a temperature of about 1800° F., and with a contact time of less than 5 seconds; however, Wulff did not suggest that ethylene might likewise be produced, nor certainly that major quantities of acetylene and ethylene could be produced in the same plant by control of sulfur feed concentration, reaction temperature and contact time. Similarly, Monroe and Ipatieff, U.S. Patent No. 2,197,872, describe the production of small amounts of ethylene from normal butane and elemental sulfur at a reaction temperature of 600° C. (1112° F.) over a catalyst comprising alumina promoted by sodium aluminate; however, production of acetylene is not mentioned, nor at these conditions could any acetylene be made.

I have found that various hydrocarbons can be contacted with elemental sulfur in temperatures in the range of 1450° F. to 1650° F. and with contact times ranging from 0.1 second to 2 seconds to produce very high total yields of ethylene and acetylene and in relative proportions in the range of those specified to be of commercial importance. If the same hydrocarbon feeds are contacted at the temperatures and times which I specify but in the absence of sulfur, little acetylene is obtained. If temperatures exceed 1650° F., ethylene yields decline (as do, in fact, the total yields of acetylene and ethylene), and above 1700° F. little or no ethylene can be made. Thus, my invention provides a set of operating conditions at which elemental sulfur and a hydrocarbon can be combined to produce both acetylene and ethylene as major products. Furthermore, as will be apparent, yields of ethylene and acetylene which are produced from ethane by my process approximate 85 weight percent, slightly exceeding the 80% yield of ethylene that can be obtained from the same feed by pyrolysis, widely exceeding acetylene yields of 25% weight percent obtained by partial oxidation, and finally, widely exceeding yields of acetylene and ethylene obtained by partial oxidation-pyrolysis. Further advantakes of my process are (a) it can be employed using any suitable reactor design including pyrolysis furnaces, or either fixed bed or moving bed systems which use solids as heat sinks, (b) the endothermic heat requirements of my process are much less than those of simple pyrolyis, and (c) because the process is very selective and does not produce major quantities of hydrogen, recovery and purification equipment are considerably simplified.

Hydrocarbon gases advantageously processed by my invention include refinery gases, ethane, propane, butane, pentane, natural gasoline, and light and heavy naphtha. These feedstocks comprise aliphatic hydrocarbons of carbon numbers ranging from 2 to about 6. Ethane is a preferred feed for my process. As recovered from natural gas, such ethane may be in admixture with substantial quantities of propane. Since in my process, ethylene may be recycled to produce aditional quantities of acetylene, such ethylene may also be in the total feed to the sulfoxidation step.

Although elemental sulfur is a primary reactant in the sulfoxidation step, as mentioned above there may be little or no net consumption of sulfur in the overall process when the reconversion step is used. Steam may or may not be present in the sulfoxidation step, although at the higher limits of the temperature range specified, steam is generally undesirable. Other sulfur-containing gases such as hydrogen sulfide, carbonyl sulfide, sulfur dioxide, and carbon disulfide do not deleteriously affect the sulfoxidation reaction, and in some cases it may be desirable to include such gases as minor components of the feed.

The sulfur content of the feed to the sulfoxidation reactor (including recycled hydrocarbons if such recycle is employed) may vary from 0.25 to 2.5 moles of $S_2$ per mole of $C_2$ and heavier hydrocarbons in the total feed. Actually, the concentration of sulfur in the feed is quite critical, since if it is too low, it will be impossible to produce the quantity of acetylene specified in this invention, whereas high sulfur concentrations are not only uneconomic but also tend to increase tar yields. In addition, sulfur concentration (as well as temperature and time) provides a degree of freedom by which relative yields of ethylene and acetylene may be varied in a given plant. Within the range specified, the feed sulfur content will also depend on the type of feed and reaction system employed as well as on the reaction temperature and time. With a feed such as ethane, the mole ratio of sulfur in the feed will tend to be higher than with a feed such as naphtha, always within the range specified above.

Sulfoxidation reaction temperatures are in the range of 1450° F. to 1650° F. (In cases where the reaction is carried out in a system which is not isothermal, the reaction temperatures here designated are the average temperatures in the reactor.) Here again, the reaction temperature will depend on the type of feed and reaction system employed, the sulfur content of the feed, the contact time, and the desired ratio of acetylene to ethylene. Low molecular weight feeds such as ethane will require the highest temperatures within the range specified, whereas higher molecular weight hydrocarbons may be processed at the lower limits of this range. Peculiarly, within the range specified, the lowest reaction temperatures and the highest seem to produce the highest ratios of acetylene to ethylene, whereas intermediate temperatures seem to produce the highest ratios of ethylene to acetylene.

The contact times of 0.1 to 2.0 seconds specified herein for the sulfoxidation reaction are also critical in the attainment of high yields. Again, the precise contact time used in a given application of this invention depends on the feed and all of the other reaction variables. Since in some of the reaction systems which may be used the reaction temperature may vary over the contact zone, the contact time as here specified is that extant over the part of the reactor above 1450° F.

The preferred sulfoxidation reaction pressure is essentially atmospheric, i.e. between 5 p.s.i.a. and 100 p.s.i.a. In most cases it is desirable that the pressure be as close to atmospheric as possible. However, unavoidable pressure drops in reactors and in recovery equipment may require somewhat higher total pressures up to about 300 p.s.i.a. to be used. Such higher pressures also economize recovery system design in some cases.

As stated above, the endothermic heat requirements of my process are much less than in pyrolytic processes which do not employ sulfur. Thermodynamic data show that in the production of ethylene from ethane without sulfur, this endothermic heat requirement is 2250 B.t.u. per pound of ethylene produced, whereas with sulfur the corresponding requirement is only 830 B.t.u. per pound of ethylene produced. Because of these lowered heat requirements, design of a pyrolysis heat furnace to carry out my invention is considerably simplified, because high heat fluxes are not required, so that there is less danger of coke formation on the reactor walls. Correspondingly, in systems where particulate solids are used as heat sinks, fuel requirements are lessened, and more importantly, reaction temperature swings are considerably reduced, permitting better control of reaction conditions and consequently higher overall yields. When particulate solids are used as heat sinks, they may be continuously transported from the reaction zone and reheated by burning off the coke and/or contacting the solids with any hydrocarbon fuel and air, after which they may be transported back to the reactor zone to supply the endothermic heat requirements. Another way often used to employ solids as heat sinks is the fixed bed cyclic regeneration system, in which the feed is contacted with hot solids for a certain period of time until the solid cools, after which feed is discontinued and the solids regenerated and reheated; in this case it is obvious that the use of multiple beds permits continuous production.

In the process of this invention, quenching of the reaction products is desirable to obtain the highest yields of acetylene. Such quenching may be carried out with liquids such as water or elemental sulfur, or with fluidized solids, with the general objective of reducing the temperature of the sulfoxidation reactor effluent to less than 1000° F. in a minimum period of time. Details of this operation have been widely described and are well known to those skilled in the art.

As mentioned above, an economically important feature of the invention is the reconversion of the hydrogen sulfide formed in the sulfoxidation step to elemental sulfur by a second step.

In this reconversion step, other sulfur compunds formed in the reaction may likewise be reconverted to elemental sulfur along with the hydrogen sulfide. Such other compounds, usually in small quantities may comprise carbon disulfide, thiophene or even higher boiling sulfur compounds. In some cases these other sulfur compounds may be more economically recycled back to the first step reactor without reconversion to elemental sulfur. In all cases, however, it is desirable to reconvert the hydrogen sulfide formed as the major co-product.

Conversion of hydrogen sulfide to elemental sulfur may be accomplished by a two stage process commonly called the "Claus process." In the first stage, the hydrogen sulfide is burned with an oxygen-containing gas (conventionally air) to produce sulfur dioxide at temperatures of between 1300° F. and 3000° F., and in the second stage, the sulfur dioxide is catalytically combined wtih additional hydrogen sulfide at about 500° F. to produce elemental sulfur, as represented by the following equations:

$$H_2S + \tfrac{3}{2}O_2 \rightarrow SO_2 + H_2O$$
$$2H_2S + SO_2 \rightarrow \tfrac{3}{2}S_2 + 2H_2O$$

Two modifications of this classic process exist: the first, in which all of the hydrogen sulfide is mixed with an insufficiency of air for entry into the first stage combustion zone; the second, in which only one-third of the hydrogen sulfide is inserted into the first combustion zone, with the remaining two-thirds bypassed to enter the second catalytic zone.

I have found that the heat released by the highly exothermic reconversion reactions may be valuably utilized in carrying out the sulfoxidation reactions. Both stages of the reconversion process are exothermic, and as noted above, the first stage combustion is carried out at very high temperatures. In conventional Claus process technology, available heat is converted to low and moderate pressure steam. However, in the process of my invention, since the exothermic heat released in the overall reconversion step (a minimum of about 2000 B.t.u. per pound of elemental sulfur produced) fully satisfies the endothermic heat required to carry out the desired sulfoxidation reactions (1000–1600 B.t.u. per pound of elemental sulfur converted), it is highly advantageous to utilize the heat from the reconversion reactions to preheat the reactants to the sulfoxidation step. Since the first (combustion) stage of the reconversion step is carried out at temperatures of between 1300° F. and 3000° F., and since the sulfoxidation reactions are carried out between 1450° F. and 1650° F., not only does the reconversion step provide an adequate quantity of heat, but it provides an adequate temperature level. If desirable, both the total quantity of heat and the temperature level may be increased by increasing the quantity of hydrocarbons contained in the hydrogen sulfide fed to the reconversion step; this may be accomplished by using methane produced in the sulfoxidation reactions, which has generally no value other than for fuel.

As stated above, in most cases it is also desirable to pass small amounts of organic sulfur compounds produced in the sulfoxidation reactions to the reconversion step. Such a practice eliminates the need for disposing of undesirable by-products, and increases the total heat available and the temperature level of the reconversion step; similarly, by this practice the net utilization of elemental sulfur in the overall process is reduced as previously described.

Utilization of the heat available from the reconversion step may be carried out by various methods to those skilled in the art. Of considerable importance in this respect is the fact that advances in material sof construction have permitted direct heat exchange to be practiced at temperatures as high as 1200° F. and, in special cases, as high as 1500° F. In exchanging the feed components to the sulfoxidation step (generally elemental sulfur and hydrocarbons), it is not desirable to carry hydrocarbon-containing streams to a temperature level above 1300° F., and preferably not above 1200° F., because of thermal decomposition and coking in the exchangers. However, sulfur alone my be preheated to as high a temperature possible economically without such fear.

In conventional practice of the Claus process, elemental sulfur is a product and is generally separated from the co-produced water (and small amounts of carbon dioxide, sulfur dioxide and unreacted hydrogen sulfide), and from the large quantity of nitrogen residual from the air used in the combustion stage. However, in the process of my invention, the elemental sulfur formed in the reconversion step may be reused directly. Since the water vapor, nitrogen, and traces of sulfur dioxide, carbon dioxide, and hydrogen sulfide are not a priori deleterious in the sulfoxidation reactions, in some cases it may be advantageous to pass the total effluent from the reconversion step directly to the sulfoxidation step. Such a practice is particularly desirable in cases wherein it is advantageous to carry out the sulfoxidation reaction at the higher levels of total operating pressure used in this invention, but with reduced partial pressures of the reactants. In such event, the steam and nitrogen from the reconversion step act as diluents in reducing the partial pressure of the sulfoxidation reactants. It is apparent that many possibilities exist in this respect, such as, for example, removing the steam but not the nitrogen, or vice versa.

More or less pure oxygen may be fed to the reconversion step instead of air. In this case, the temperature level of the first (combustion) stage in the reconversion step is considerably raised and, more importantly, there is little or no nitrogen in the reconversion step effluent. This, then, simply and advantageously provides sulfur with a steam diluent to the sulfoxidation reactions if desirable.

An illustrative plant for practicing the process of my invention is illustrated diagramatically in FIGURE 1. For reasons of simplicity, miscellaneous vessels, heaters, coolers, pumps, compressors, and other conventional equipment which would be employed in a specific commercial embodiment may be omitted from this illustration. In the embodiment shown in FIGURE 1, a conventional pyrolysis furnace is used to carry out the invention. In this case the hydrocarbon feed stream issues from source 1 and is preheated in exchanger 107 by the reaction heat from the second sulfur reconversion stage. The hydrocarbon feed then passes through line 61 and is further heated in exchanger 63 against the combustion gases from the first (high temperature) sulfur reconversion stage. The feed hydrocarbon stream, now at an elevated temperature, then passes through line 65 and ultimately enters the reactor through line 7.

Three other streams provide the total reactor feed. One of these is a small amount of make-up elemental sulfur obtained from storage drum 3 and vaporization heater 5. The other feed streams comprise the major part of the elemental sulfur fed to the reactor; as will be described, these are the unreacted sulfur recycled through line 53, and the sulfur obtained from the reconversion step issuing from line 77. The combined feed stream enters the reactor through line 7.

The reactor in this case is a conventional coil-type pyrolysis furnace. As indicated schematically in FIGURE 1, the furnace shell is shown as 9, the coil as 11, an dthe fuel-air mixture as 13. The reactor system is designed to operate within the temperature, pressure, and contact time limits as specified above. Products issue from the reactor system at 15 and are immediately quenched by a liquid stream, in this case liquid elemental sulfur, from 17. The products then proceed to tower 21, where sulfur and tar are separated out individually. The sulfur issues from the tower at 23. Part of this sulfur then proceeds through line 25 and through cooler 27 to provide the quench stream at 17, as stated above. The remainder of the sulfur is reheated in furnace 49 and passes to exchanger 51 where it is still additionally heated by exchange against the first stage reconversion effluent in 51 and then passes into line 53 for recycle to the reactor.

The uncondensed products from separator 21 issue through line 29, are compressed by compressor 31 and pass to the hydrogen sulfide removal system through line 33. The hydrogen sulfide removal system shown schematically as 35, in this case consists of a conventional ethanolamine system with various components for absorption, stripping, and the like. The stripped hydrogen sulfide issues from the scrubber system through line 39 and is combined with a small amount of low boiling tar from line 37 to provide the feed to the reconversion step.

In this case, the reconversion is carried out in a more or less conventional "single pass" unit. The requisite amount of air from 43 is combined with the stream of hydrogen sulfide and tar and enters the burner through line 45. The burner system, indicated as 55, is designed to burn the sulfur compounds after which the combustion products are cooled by exchangers 51 and 63 as described. Some steam also may be raised in this conversion stage. The products from the combustion stage issue through line 57 to the second reconversion stage 59 as practiced conventionally. The effluent from this stage issues through line 67 into tower 69 where elemental sulfur is separated from nitrogen and steam and small amounts of carbon oxides and sulfur-containing gases; the latter are removed through line 71. The sulfur issues from tower 69 through line 73, is reheated in heater 75, and is then recycled to the reactor through line 77.

The gaseous effluent from the hydrogen sulfide scrubbing system 35, comprising the ethylene and acetylene products as well as other light gases, proceeds through line 41, and after cooling enters tower 79. The tower bottoms, comprising primarily light hydrocarbons such as propane and heavier are withdrawn from the tower through line 81; these hydrocarbons may be recycled to the reactor via lines 105 and 65 to provide additional ethylene and acetylene. The overhead from tower 79 passes into the acetylene recovery system.

The acetylene recovery system 85, shown schematically, may comprise any conventional removal and purification arrangement. Most usually, a conventional solvent stripping-absorption system is utilized with solvents such as acetone, methanol, ammonia, n-methyl pyrrolidone, and the like. Product acetylene purity in line 87 is greater than 99% and may be as high as 99.9%.

The acetylene-free product gas is then compressed in 89, cooled, and passed through line 91 into tower 93. Methane and a small amount of hydrogen are removed from the top of the tower through 95. A stream, predominantly ethane and ethylene, is removed from the bottom of the tower through line 97 and then enters the ethane-ethylene tower 99. The ethylene product is removed from the top of this tower through line 101, and a small stream, predominantly ethane, removed from the bottom of the tower through line 103. This latter stream may be recycled to the reactor through lines 105 and 65. In some cases part of the ethylene product may be removed with the ethane through line 101 and also recycled to the reactor to produce higher yields of acetylene.

Figure 2:
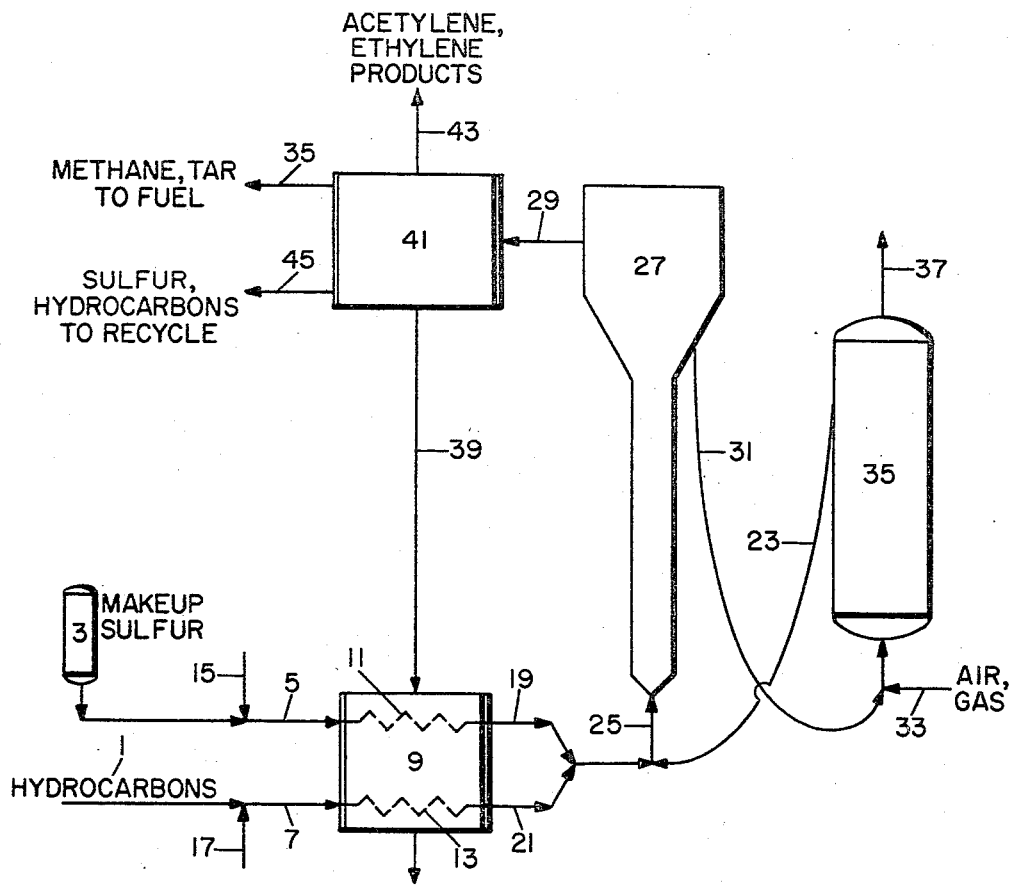

*Figure 2*

FIGURE 2 illustrates a second embodiment of this invention, in which the reconversion and recovery steps are essentially similar to those in FIGURE 1 and are only generally indicated. However, the reactor system is different from that shown in FIGURE 1 in that an inert heat carrier is employed in the reaction zone.

The hydrocarbon feed from source 1 together with recycled hydrocarbons indicated at 17 pass through line 7, are preheated by exchange against the reconversion system 9 in exchanger 13, and issue from the reconversion system in line 21. A small amount of make-up liquid sulfur from source 3 is joined with a larger amount of sulfur illustrated at 15, the latter comprising (a) sulfur recycled from the sulfoxidation reactor effluent, and (b) sulfur obtained by reconversion of the hydrogen sulfide formed in the reconversion reaction obtained more or less as described for FIGURE 1. The total sulfur stream at 5 is preheated by exchange against the first stage and second stage products from the reconversion step schematically indicated as 9 in exchanger 11, and then passes through line 19 to join the hydrocarbon stream 21.

The combined feed then picks up regenerated sand from line 23, and the feed-sand mixture passes through line 25 entering the reactor 27. Again, the reactor is designed to provide temperatures, pressures, and contact times as specified by this invention. The reaction products, freed of the sand carrier using conventional devices, leave the reactor through line 29.

The sand, now containing substantially more carbon and at a substantially lower temperature than that entering the reactor, leaves the reactor through line 31 and is transferred to the regenerator 35. A suitable quantity of air, together with other fuel as required, from source 33, is likewise passed to the regenerator. In the regenerator, coke is burned off the sand, and the temperature of the sand substantially raised. Combustion gases are vented at 37, and the regenerated hot sand transferred back to the reactor 27 through line 23 as described.

The reaction products issuing from reactor 27 through line 29 pass to the separation-recovery system 41, shown in highly schematized form. However, essentially as described previously in FIGURE 1, various products and recycle streams may be separated out and recovered. Ethylene and acetylene products are shown removed at 43. Hydrogen sulfide, to be passed to the reconversion step is shown at 39. Unreacted sulfur and small quantities of unreacted light hydrocarbons (except methane), to be recycled to the reactor, are shown at 37. Methane, and in this case tar, to be used as fuel, are shown at 35.

As stated previously, the reactor system in FIGURE 2 is only one of many possible types employing solids as heat carrier. Various other possibilities using fine solids, similar to those used for fluid catalytic cracking and fluid coking processes, may be employed. Systems using larger solid particles, such as those used in moving beds with either air lift or mechanical means of transfer may likewise be employed. Similarly, a fixed bed system may be used, wherein the feed is passed over static solids for a given period of time, after which the feed is discontinued and air together with fuel gas or tar if necessary then passed over the solids to burn off carbon and reheat the solids.

The foregoing technology is well known to those skilled in the art, and any of these systems may be used to practically carry out the novel sulfoxidation reaction of my invention in which hydrocarbons and elemental sulfur are contacted at specified conditions to produce specified quantities of acetylene and ethylene as major products.

The following examples illustrate specific process aspects of the present invention.

Example 1

This example contrasts the yields of acetylene and ethylene obtained when ethane is contacted at a temperature of 1525° F. and a contact time of 0.5 second (a) with elemental sulfur corresponding to 1.3 moles of $S_2$ per mole of ethane, according to my invention, and (b) without sulfur:

|  | With Sulfur | Without Sulfur |
|---|---|---|
| Acetylene Yield, Wt. percent | 53.0 | 2.5 |
| Ethylene Yield, Wt. percent | 30.5 | 37.0 |
| Total Yield, Wt. percent | 83.5 | 39.5 |

The results show that at the indicated conditions, the use of sulfur produces much greater yields of acetylene, as well as of total acetylene plus ethylene, than in the absence of sulfur.

Example 2

This example illustrates the criticality of reaction temperature on ethylene and total product yields, with a contact time of 1.7 seconds and an $S_2$/ethane mole ratio of 1.5:

|  | Reaction Temperature | | | |
|---|---|---|---|---|
|  | 1,500° F. | 1,600° F. | 1,650° F. | 1,700° F. |
| Acetylene Yield, Wt. percent | 51.3 | 43.8 | 44.1 | 39.6 |
| Ethylene Yield, Wt. percent | 31.8 | 35.0 | 17.0 | 4.8 |
| Total Yield, Wt. percent | 83.1 | 89.8 | 61.1 | 44.4 |

Thus, at a temperature of 1700° F., the yield of ethylene and the total yield of acetylene plus ethylene are very low. The ethylene yield is much below that specified herein to be commercially useful.

Example 3

This example illustrates the criticality of contact time on the reaction of ethane with sulfur at 1590° F., using an $S_2$/ethane mole ratio of 1.0:

|  | Contact Time | | |
|---|---|---|---|
|  | 0.05 sec. | 1 sec. | 5 secs. |
| Acetylene Yield, Wt. percent | 7.4 | 41.4 | 23.4 |
| Ethylene Yield, Wt. percent | 51.2 | 37.2 | 46.0 |
| Total Yield, Wt. percent | 58.6 | 78.6 | 69.4 |

Thus, at given conditions of temperature and sulfur concentration within those specified herein, unless a suitable contact time is employed, reduced total yields of acetylene and ethylene will be obtained.

I claim:
1. The process which comprises contacting a light hydrocarbon stream with elemental sulfur in proportions corresponding to from 0.25 to 2.5 moles of $S_2$ per mole of $C_2$ and heavier hydrocarbons in the total feed, at a temperature between 1450° F. to 1650° F., a pressure from 5 to 300 p.s.i.a., and with a contact time from 0.1 to 2.0 seconds, and recovering ethylene and acetylene as major products from the reaction zone effluent in the proportions of from 0.5 to 2.0 parts by weight of ethylene per part of acetylene.

2. The process of claim 1 in which the light hydrocarbon stream contains a substantial quantity of at least one aliphatic hydrocarbon of a carbon number between 2 and 6.

3. The process of claim 1 in which the light hydrocarbon stream is substantially ethane together with propane, recovered from natural gas.

4. The process of claim 1 in which the light hydrocarbon stream is a light naphtha boiling up to about 200° F.

5. The process of claim 1 in which said reaction is carried out over a solid, substantial non-catalytic contact agent.

6. The process of claim 5 in which said contact agent is periodically contacted with air in the absence of said light hydrocarbon stream and sulfur, and is then recontacted with said light hydrocarbons and sulfur in the absence of air.

7. The process of claim 5 in which said contact agent is continuously removed from said reaction zone, then contacted with air in the absence of said light hydrocarbon stream and sulfur, then continuously returned to said reaction zone, and then recontacted with said light hydrocarbons and sulfur in the absence of air.

8. An oxidative process which comprises contacting a light hydrocarbon stream with elemental sulfur in proportions corresponding to from about 0.25 to 2.5 moles of $S_2$ per mole of $C_2$ and heavier hydrocarbons in the total feed, in an endothermic reaction at a temperature between 1450° F. to 1650° F., a pressure from 5 to 300 p.s.i.a. and with a contact time of from 0.1 to 2.0 seconds, contacting hydrogen sulfide produced from said endothermic reaction with an oxygen-containing gas in a second exothermic reaction step to produce a predominant part of the elemental sulfur required in the first-said reaction, and recovering ethylene and acetylene as major products in the proportions of from 0.5 to 2.0 parts per weight of ethylene per part of acetylene.

9. The process of claim 8 in which the light hydrocarbon stream contains a substantial quantity of at least one aliphatic hydrocarbon of a carbon number between 2 and 6.

10. The process of claim 8 in which the light hydrocarbon stream is substantially ethane together with propane, recovered from natural gas.

11. The process of claim 8 in which the light hydrocarbon stream is a light naphtha boiling up to about 200° F.

12. The process of claim 8 in which said first reaction is carried out over a solid, substantially non-catalytic contact agent.

13. The process of claim 8 in which a substantial part of the endothermic heat required in said first reaction is supplied by exchanging the feed thereto with the products of said second, exothermic reaction step.

14. The process of claim 8 in which said second, exothermic reaction step is carried out using substantially purified oxygen, substantially the total effluent from said second step being fed without separation for use in said first reaction step.

15. The process of claim 8 in which the pressure in the first step is between 5 and 100 pounds per square inch absolute.

16. The process which comprises reacting a light hydrocarbon stream containing a substantial quantity of at least one aliphatic hydrocarbon of a carbon number between 2 and 6 with elemental sulfur, in proportions corresponding to from 0.25 to 2.5 moles of $S_2$ per mole of $C_2$ and heavier hydrocarbons in the total feed, at a temperature between 1450° F. to 1650° F., with a contact time of from 0.1 to 2.0 seconds and at substantially atmospheric pressure, to produce ethylene and acetylene as major products in the proportions of from 0.5 to 2.0 parts by weight of ethylene per part of acetylene.

17. An oxidative process which comprises a first step of reacting a light hydrocarbon stream containing a substantial quantity of at least one aliphatic hydrocarbon of a carbon number between 2 and 6 with elemental sulfur in proportions corresponding to from 0.25 to 2.5 moles of $S_2$ per mole of $C_2$ and heavier hydrocarbons in the total feed, in an endothermic reaction at a temperature between 1450° F. to 1650° F., with a contact time of from 0.1 to 2.0 seconds, and at substantially atmospheric pressure, to produce ethylene and acetylene as major products in the proportions of from 0.5 to 2.0 parts by weight of ethylene per part of acetylene together with hydrogen sulfide, and a second step of reacting said hydrogen sulfide with an oxygen-containing gas in an exothermic reaction to produce elemental sulfur which is passed to said first step to furnish a predominant part of the sulfur required in said first step.

References Cited

UNITED STATES PATENTS

| | | | |
|---|---|---|---|
| 1,880,310 | 10/1932 | Wulff | 260—679 |
| 1,965,770 | 7/1934 | Burgin | 260—679 |
| 2,471,104 | 5/1949 | Gohr | 260—679 |

DELBERT E. GANTZ, *Primary Examiner.*

J. D. MYERS, *Assistant Examiner.*